(12) United States Patent
Peters et al.

(10) Patent No.: US 8,144,950 B2
(45) Date of Patent: Mar. 27, 2012

(54) METHOD FOR FACILITATING POST-PROCESSING OF IMAGES USING DEFORMABLE MESHES

(75) Inventors: Jochen Peters, Aachen (DE); Olivier Ecabert, Aachen (DE); Juergen Weese, Aachen (DE); Christian Lorenz, Hamburg (DE); Jens Von Berg, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 951 days.

(21) Appl. No.: 12/097,855

(22) PCT Filed: Dec. 14, 2006

(86) PCT No.: PCT/IB2006/054866
§ 371 (c)(1),
(2), (4) Date: Jun. 17, 2008

(87) PCT Pub. No.: WO2007/072363
PCT Pub. Date: Jun. 28, 2007

(65) Prior Publication Data
US 2008/0304744 A1 Dec. 11, 2008

Related U.S. Application Data

(60) Provisional application No. 60/751,536, filed on Dec. 19, 2005.

(51) Int. Cl.
*G06K 9/00* (2006.01)
(52) U.S. Cl. ..................... 382/128
(58) Field of Classification Search .......... 382/128
See application file for complete search history.

(56) References Cited

U.S. PATENT DOCUMENTS

| 4,959,868 | A | * | 9/1990 | Tanioka | 382/176 |
| 6,009,435 | A | | 12/1999 | Taubin | |
| 6,573,890 | B1 | * | 6/2003 | Lengyel | 345/419 |
| 6,606,095 | B1 | * | 8/2003 | Lengyel et al. | 345/473 |
| 6,614,428 | B1 | * | 9/2003 | Lengyel | 345/420 |

(Continued)

FOREIGN PATENT DOCUMENTS

WO 03021532 A2 3/2003

(Continued)

OTHER PUBLICATIONS

Luomin, Gao et al "Automatic Liver Segmentation Technique for Three-Dimensional Visualization of CT Data" Radiology Radiol. Soc. North America USA, vol. 201, No. 2, Nov. 1996, pp. 359-364.

(Continued)

*Primary Examiner* — Dixomara Vargas

(57) ABSTRACT

Method and system for facilitating post-processing of images using deformable meshes in which a deformable mesh model of an object such as an organ is extended by attaching information thereon in order to simplify and/or facilitate a desired post-processing task so that the post-processing task effected when the mesh is applied to the same object in an additional image can expeditiously use this information. The information may be attached to the mesh after its creation, for example, upon segmentation of the same object in some training image. The post-processing task can therefore be performed automatically without user interaction upon segmentation of the object in the additional image. Information is encoded on the mesh by enumerating a list of triangles or vertices of the mesh which have to be considered in the subsequent, post-processing task and by optionally providing additional parameters defining the precise post-processing algorithm(s) to be used.

20 Claims, 2 Drawing Sheets

U.S. PATENT DOCUMENTS

| | | | |
|---|---|---|---|
| 6,718,290 B1 | 4/2004 | Szymezak | |
| 2001/0014119 A1 * | 8/2001 | Chun et al. | 375/240.01 |
| 2003/0068074 A1 | 4/2003 | Hahn | |
| 2003/0076319 A1 | 4/2003 | Hiraga | |

FOREIGN PATENT DOCUMENTS

| | | |
|---|---|---|
| WO | 2004010374 A2 | 1/2004 |
| WO | 2005048193 A1 | 5/2005 |
| WO | 2005114575 A1 | 12/2005 |

OTHER PUBLICATIONS

McInerney, Tim et al Deformable Models in Medical Image Analysis: A Survey. Medical Image Analysis, vol. 1, No. 2 pp. 91-108, 1996.

Zach, Christopher et al "Progressive Compression of Visibility Data for View-Dependent Multiresolution Meshes" Jul. 2005, VRVis Research Center.

* cited by examiner

METHOD FOR FACILITATING POST-PROCESSING OF IMAGES USING DEFORMABLE MESHES

The present invention relates generally to methods for facilitating post-processing of images using deformable meshes and more specifically, to methods for facilitating post-processing of images of anatomical structures, such as organs, which have been segmented by means of deformable meshes.

In medical image processing applications, various processing tasks are typically performed on the images. One specific processing task, which is a fundamental task in many image processing applications, is the segmentation of a specific organ. For many organs, segmentation can successfully be performed with shape-constrained deformable models. They are based on a mesh structure with a topology which remains unchanged during adaptation to the image being segmented. Model-based segmentation has been considered very efficient for a wide variety of simple to complex organs (bones, liver, heart with nested structures). Indeed, recent results show that this technique enables fully automatic segmentation of complex anatomical structures such as the heart.

After an organ is segmented, the organ is typically subjected to one or more additional image processing tasks, i.e., post-processing tasks, using the mesh model. That is, an image of the organ may be displayed, after application of the post-processing task, which is derived from the original image, with the differences between the original image and the derived image being rendered by application of the mesh model.

Most if not all post-processing tasks require user interaction, for example, to select or define a starting point, seed point or region-of-interest for initializing an algorithm. For example, to initialize a vessel tracking algorithm, it is necessary to place a seed point within the vessel to be tracked or segmented and this seed point must often be manually selected or determined.

By requiring user interaction to initiate a post-processing task, the medical image processing application is not being performed under optimal conditions. Drawbacks include lack of efficiency of the individual responsible for processing the image (usually a radiologist), difficulty or inexperience in using the image analyzing apparatus from which errors in the manual selection or determination of the initial conditions of the post-processing task might arise, and limitations on the complexity of the post-processing task which arise from the required manual action.

Accordingly, automation of the post-processing task could facilitate increased efficiency of the radiologist, an improved ease-of-use of the image analyzing product leading to fewer or no errors in the application of the post-processing task, and enable image applications with more complex post-processing tasks.

It is an object of the present invention to provide new and improved methods and systems for facilitating post-processing of images using deformable meshes.

It is yet another object of the present invention to provide new and improved methods and systems for facilitating post-processing of images of anatomical structures, such as organs, which have been segmented by means of deformable meshes.

It is another object of the present invention to provide new and improved methods and systems for expediting post-processing tasks of medical images by eliminating the need for user interaction to initialize image processing algorithms. Specifically, the method can be effective to avoid the need for a user to manually determine a starting point, seed-point or region-of-interest for use in the image processing algorithms, and accomplishes this by exploiting the results of a preceding image segmentation from which required information for the post-processing task is derived.

It is still another object of the present invention to provide new and improved methods and systems which transfer knowledge obtained by correct image segmentation to subsequent image processing tasks in order to reduce and even eliminate manual user interaction to initialize subsequent processing steps and thereby enable a fully automated image processing chain.

In order to achieve these objects and others, a method in accordance with the invention extends a deformable mesh model of an object such as an organ by attaching information thereon, in order to simplify and/or facilitate a desired post-processing task so that the post-processing task effected when the mesh is applied to the same object in an additional image can advantageously use this information. The information may be attached to the mesh after its creation, for example, upon segmentation of the same object in some training image. The post-processing task can therefore be performed automatically without user interaction after segmentation of the object in the additional image and application of the same mesh model to that object or image.

An implementation of this concept is to enumerate a list of triangles or vertices of the mesh, which have to be considered in the subsequent, post-processing task. This list, or the specific triangles or vertices of the mesh, would be encoded on the mesh or otherwise differentiated in the mesh. Furthermore, additional information such as, for example, a distance value or map or some probability values for each listed triangle or vertex, could be encoded on the mesh. The information derived based on the segmentation of the training image may therefore be a probability function representing the probability of usefulness of each triangle or vertex of the mesh for the post-processing task.

For example, after segmenting cardiac chambers and attached aorta, the possible location of the ostia where the coronary arteries branch off from the aorta can be automatically restricted, the search space for coronary vessels can be automatically restricted to a thin layer around the myocardium since they are known to be close to the epicardial wall, and the application of fine segmentation of papillary muscles which might not be treated in detail in the initial chamber segmentation can be automatically limited to only beneficial locations.

More generally, a method for expediting post-processing of an object in an image being segmented using a deformable or adaptive mesh in accordance with the invention comprises identifying a post-processing task to be performed upon the object after segmentation using the mesh, determining information required for the post-processing task, encoding the information on the mesh, segmenting the object in a new or additional image using the mesh with encoded information, and performing the post-processing task by extracting the encoded information from the mesh. The post-processing task will therefore cause an image to be displayed for observation purposes after application of the post-processing task, with the displayed image being derived from the original image.

Determination of the information required for the post-processing task may entail acquiring at least one training image including the object, segmenting the object in the training image(s) by means of the mesh and deriving the information based on the segmentation of the training image(s). It is also conceivable that the information required for the post-processing task can be determined based on the user's anatomical knowledge, e.g., the user could assign a list of triangles or vertices of a pre-existing mesh without the need for a previously segmented image.

Multiple post-processing tasks can be defined, each having different required information to enable performance thereof. As such, different information can be encoded on the mesh and/or in different portions of the mesh. For example, different types of data required for the post-processing task can be encoded in different regions of the mesh such that different post-processing tasks are applicable on different regions of the mesh upon segmentation of the new image.

In exemplifying embodiments, the object in the image being segmented is a heart and the information required for the post-processing task is: the position of the ostia such that the post-processing task is to ascertain the position of the ostia, the presence of a coronary vessel such that post-processing task is vessel tracking or segmentation, the location of regions of the heart to which refined segmentation is to be applied, and the identification of a valve region in the heart to be artificially flattened. The information required for the post-processing task may possibly be, but is not required to be, derived based on the segmentation of the training image(s). It could alternatively be based on the user's anatomical knowledge and skill in identifying the required information.

For ostia position determination, the information encoded on the mesh is the identification of triangles or vertices of the mesh within a predetermined distance to actual ostium positions in the training image(s), the mesh being encoded with the identified triangles or vertices and the distance between each triangle or vertices and the ostium position. The post-processing task would be execution of an algorithm to analyze the identified triangles or vertices to determine the likelihood of an ostium being present therein or thereat. Further, an additional post-processing task could be execution of a coronary tree algorithm which would receive as input seed points obtained from the determination of the position of the ostia. In this case, an image would be displayed which is derived from the original image and shows the position of the ostia, possibly demarcated, delineated or otherwise differentiated from remaining parts of the image.

For vessel tracking, the information encoded on the mesh is the likelihood of each triangle or vertex of the mesh containing a surface in which the coronary vessel is near, i.e., within a predetermined or threshold distance. The post-processing task may then be execution of an algorithm which analyzes only those parts of the image, i.e., datasets, with a high likelihood of containing a surface in which the coronary vessel is near. The information may also be a distance value between each triangle or vertex of the mesh and coordinates of the coronary vessel. In this case, the post-processing task is execution of an algorithm to analyze only parts of the image, i.e., the datasets, within a predetermined distance from the coordinates of the coronary vessel, which distance might have to be increased depending on the results of the execution of the algorithm. An image showing the position of one or more coronary vessels, possibly demarcated, delineated or otherwise differentiated from remaining parts of the image, would thereby be formed and capable of being displayed, having been derived or rendered from the original image of the heart.

For refined segmentation which is generic and applicable subsequent to any form of image segmentation using a mesh, the information encoded on the mesh is the identification of regions of the mesh to be subject to refined segmentation, the mesh being encoded with the triangles or vertices in each identified region. The post-processing task may be the execution of a refined segmentation algorithm to additionally segment the portion of the image represented by the encoded triangles or vertices.

For valve region flattening, the information encoded on the mesh is the identification of triangles or vertices in an area of the valve region to be flattened with the post-processing task being execution of a flattening algorithm to shift the identified triangles or vertices.

An image processing system in accordance with the invention which is capable of performing the above methods includes an image acquisition device for acquiring images of objects to be processed, a display for displaying images acquired by the image acquisition device before and after processing, a processing unit coupled to the image acquisition device, the display and the processing unit and a user interface for controlling the image acquisition device and the processing unit. The processing unit enables, via the user interface, initiation of image acquisition, initiation of mesh model-based segmentation of an object in the image, identification of a post-processing task to be performed upon the object after segmentation using the mesh and determination of information required for the post-processing task. Further, the processing unit encoding of the determined information on the mesh, segmentation of the object in a new image acquired by the image acquisition device using the mesh with encoded information, automatic performance of the post-processing task by extracting the encoded information from the mesh and display of the image after post-processing on the display. The displayed image is thereby derived from the original image and reflects execution of the post-processing task. If one or more training images are used to determine the information required for the post-processing task, the processing unit also enables acquisition of the training image(s) via the image acquisition device, segmentation of the object in the training image(s) acquired by the image acquisition device by means of the mesh and deriving of the information based on the segmentation of the training image(s).

The invention also encompasses computer readable media which embodies software capable of performing the steps of the method. To this end, the computer readable media effects image processing in an image processing system including an image acquisition device for acquiring images of objects to be processed, a display for displaying images acquired by the image acquisition device before and after processing, and a user interface for controlling the image acquisition device. The media is arranged to initiate image acquisition via the user interface, initiate mesh model-based segmentation of an object in the image via the user interface, identify a post-processing task to be performed upon the object after segmentation using the mesh via the user interface, determine information required for the post-processing task via the user interface, encode the determined information on the mesh, segment the object in a new image acquired by the image acquisition device using the mesh with encoded information, automatically perform the post-processing task by extracting the encoded information from the mesh, and display the image after post-processing on the display. The displayed image is derived from the original image and reflects execution of the post-processing task. If one or more training images are used to determine the information required for the post-processing task, the media is further arranged to enable acquisition of the training image(s) via the image acquisition device, segment the object in the training image(s) acquired by the image acquisition device by means of the mesh and derive the information based on the segmentation of the training image(s).

The invention, together with further objects and advantages thereof, may best be understood by reference to the following description taken in conjunction with the accompanying drawings wherein like reference numerals identify like elements.

Figure 1:
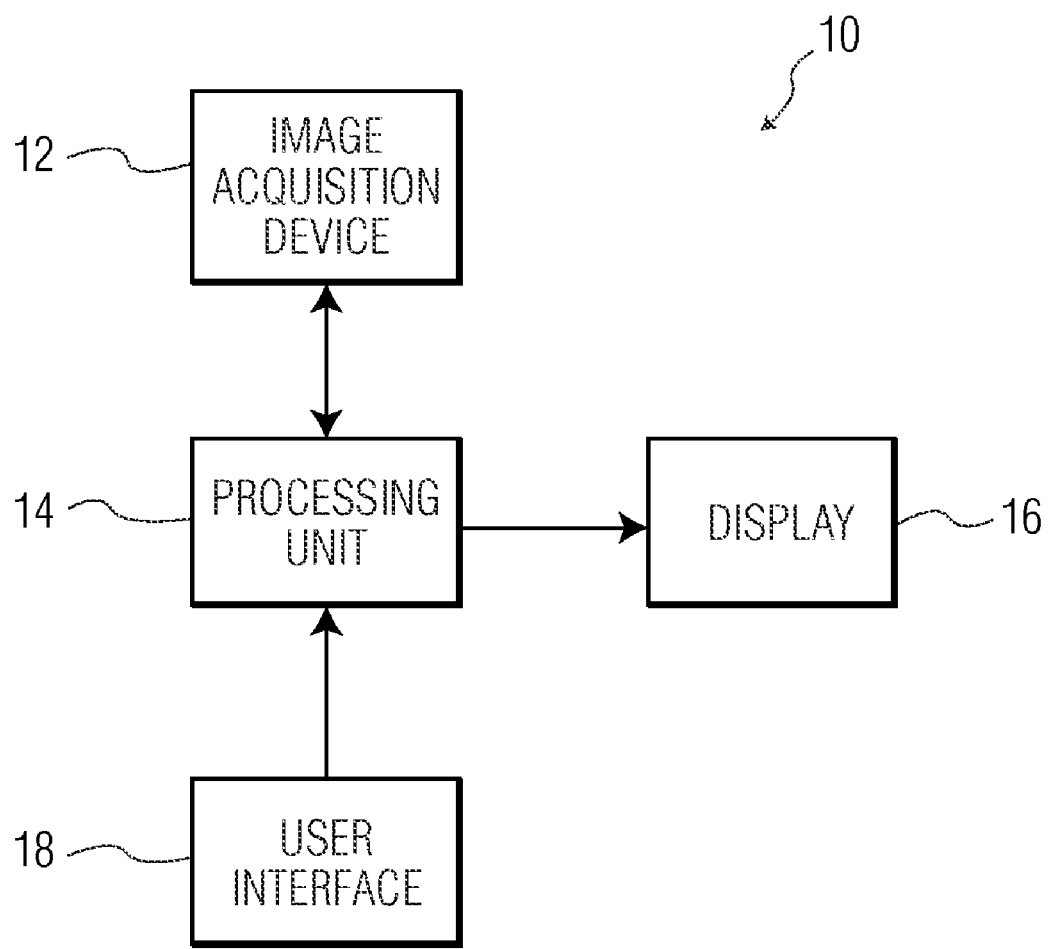
FIG. 1 shows a schematic representation of an image processing arrangement in accordance with the invention which is capable of performing a method in accordance with the invention.

Referring to the accompanying drawings wherein like reference numbers refer to the same or similar elements, FIG. 1 shows a simplified schematic representation of an embodiment of an image processing system 10 which is capable of applying image processing methods in accordance with the invention. System 10 includes an image acquisition device 12 which acquires an image which is to be processed to obtain information therefrom. Image acquisition device 12 may be an ultrasound imaging device which obtains ultrasound images including an organ of interest and about which information is sought by means of the image processing application. Additional image acquisition devices applicable for use in the invention include a CT device, an MRI device and the like.

System 10 includes a processing unit 14 coupled to the image acquisition device 12 and which obtains the images therefrom in an electronic form. Processing unit 14 can control image acquisition device 12 to obtain images upon command. Processing unit 14 includes typical hardware components such as a memory component and software to enable it to, among other things, segment an image by means of a deformable mesh, store the mesh and apply the mesh to another image. The software is embodied on computer readable media resident in the processing unit 14 which enables the processing unit 14 to control the various components of the system 10 in order to perform the steps of methods in accordance with the invention described below.

A display 16 is also coupled to the processing unit 14 and shows the image obtained by the image acquisition device 12 or an image derived by the processing unit 14 from the image obtained by the image acquisition device 12. The image derived by the processing unit 14 may be a derivation of the original image which is obtained upon application of a post-processing task in the manner described below. The original image is not necessarily changed, but rather, additional images are derived therefrom. The original image acquired by the image acquisition device 12, e.g., a scanner, might be a three-dimensional image whereas the additional images displayed on display 16, and derived from application of the segmentation process and post-processing task described below, might be a three-dimensional rendering showing or alternatively, a cut through a volume or another type of image.

A user interface 18 is coupled to the processing unit 14 to control the processing unit 14, e.g., to control the images being derived by the processing unit 14 from the images obtained by the image acquisition device 12. User interface 18 can also effect control of the image acquisition device 12 through the processing unit 14. Thus, user interface 18 is used to determine the image acquisition tasks to be performed by the image acquisition device 12 and the image processing tasks to be performed by the processing unit 14.

Figure 2:
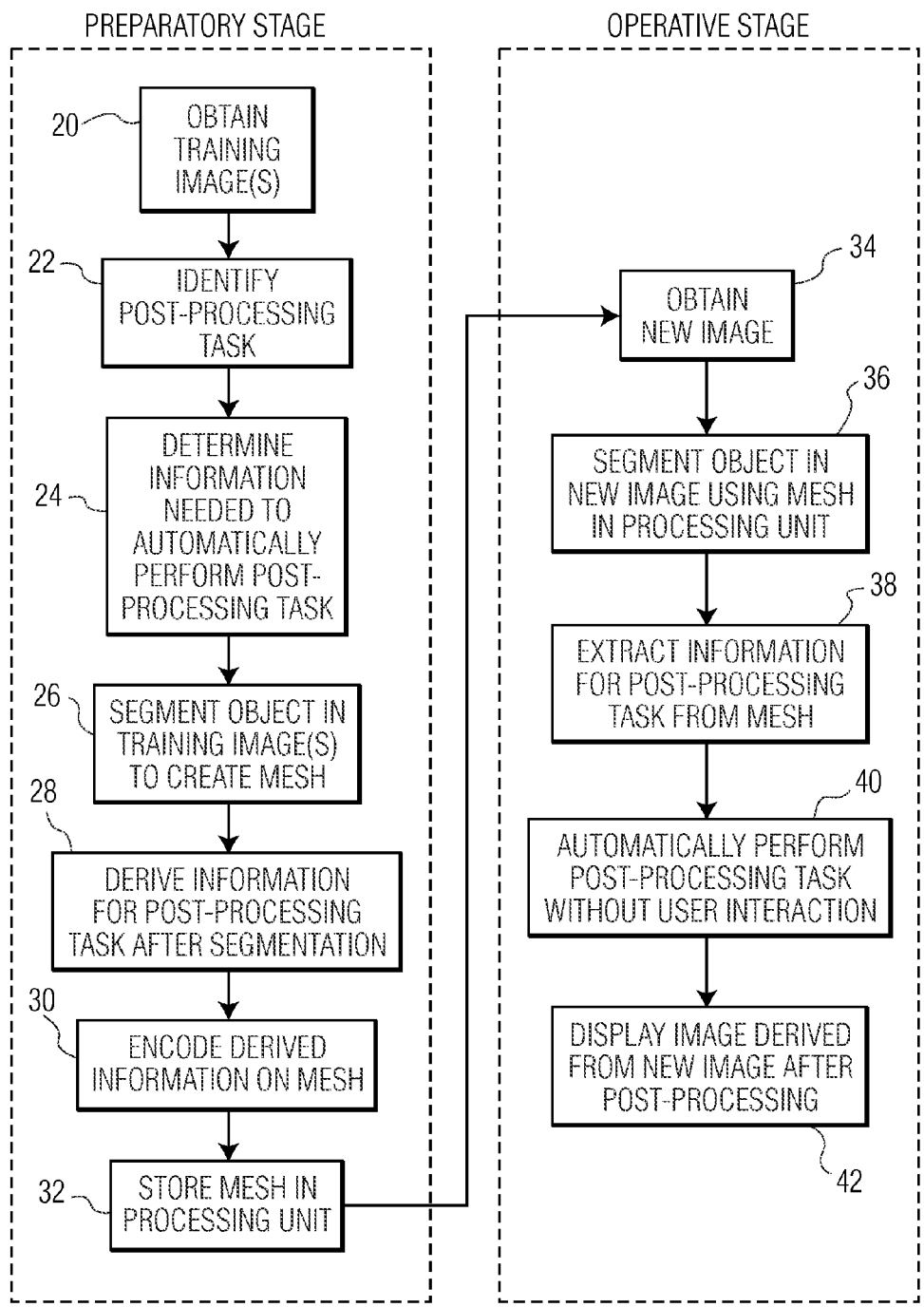
FIG. 2 is a flow chart of a method for facilitating post-processing of images using a deformable mesh in accordance with the invention.

Referring now to FIG. 2, using the system 10, a method for facilitating post-processing of images using deformable meshes in accordance with the invention includes a preparatory stage and an operative stage. In the preparatory stage, the method includes obtaining a training image 20 which contains an object being analyzed from the image acquisition device 12 and identifying the specific post-processing task to be performed on an object in the image 22. Thereafter, the information needed to automatically perform this post-processing task is determined 24. Different items of information needed for various post-processing tasks are described below.

The image in its entirety or only the object in the training image is segmented by means of a deformable or adaptive mesh 26. The manner in which an object can be defined and segmented by means of a deformable or adaptive mesh is well-known in the art to which the invention is directed.

After the segmentation of the object by means of the mesh, the information needed for the post-processing task is derived 28 and inserted into the mesh 30. Typically, the information is encoded on the mesh, i.e., certain pieces of information are associated with each triangle or vertex of the mesh. The mesh may also be considered to be labeled in that information has been attached to it to identify it. The information may be a value representing the possibility or probability that the triangle or vertex contains an object of interest and a value representing the distance between the triangle or vertex and a location of interest in the image. Either a single piece of information can be associated with each triangle or vertex or multiples pieces of information can be associated with each triangle or vertex.

A basic implementation of the encoding concept is to enumerate a list of triangles or vertices of the mesh, which have to be considered in the post-processing task. This list, or the specific triangles or vertices of the mesh, would be encoded on the mesh or otherwise differentiated in the mesh. Furthermore, additional information such as, for example, a distance map or some probability values for each listed triangle or vertex, could be encoded on the mesh. Other examples of additional information might be the locally expected vessel radius and/or orientation.

Subsequent to the encoding of the information on the mesh, the mesh with associated information is optionally stored 32 in the processing unit 14.

One basic property of the deformable meshes used in the invention is that the structure (topology) of the mesh is fixed during adaptation to a new image being segmented. This invariance is important for enabling information for image post-processing tasks to be encoded on the mesh. For example, if the post-processing task involves a search for specific object of interest or structure, triangles of the deformable mesh can be encoded with information as to whether each is within a set distance to that structure. As described in the examples below, these structures might be the ostia where the coronary arteries branch off from the aorta or the typical location of coronary arteries on the epicardial wall.

As an alternative to the use of training images in order to derive the information required for the post-processing task, it is possible to determine the information required for the post-processing task based on the user's anatomical knowledge. The user might be sufficiently skilled to be able to assign an appropriate list of triangles or vertices of a pre-existing mesh needed to enable performance of the post-processing task without requiring segmentation of a training image. In this case, steps 20, 26 and 28 of the method shown in FIG. 2 are unnecessary and the method would proceed from the determination of the information needed for the post-processing task 24 directly to the encoding of this information on the mesh 30.

In the operative stage when the new image is to be subjected to the same post-processing task for which information to enable automatic application thereof has been encoded on the mesh, the new image is obtained 34 and the image or only the object therein is segmented 36 using the same mesh used to segment the object in the training image, i.e., the mesh is adapted to the object in each additional image. The information for the post-processing task is extracted 38 from the mesh and the post-processing task is automatically performed 40 using the extracted information. Prior to adaptation of the mesh to the new image, a determination may be made as to whether a new image obtained by the image acquisition device 12 is to be subjected to the same post-processing task for which information to enable automatic application thereof has been encoded on the mesh. If not, the different post-processing task is identified and information to enable this new post-processing task is identified and the method proceeds accordingly.

After performing the post-processing task 40, modified images derived by the processing unit 14 can be displayed 42 on the display 18. The modified images are derived from both the original image acquired by the image acquisition device 12 and the mesh with encoded information. By using both of these sources to generate the modified image, improvements in the analysis of the organ in the image are obtained, including the speed with which the organ can be analyzed, the clarity of the organ, and the display of parts of the organ which are of interest for viewing purposes.

The extracted information is designed to facilitate and expedite execution of the post-processing task by providing information needed to initiate the post-processing task. Since such information is available immediately upon application of the mesh to the new image and segmentation of the object therein, user interaction is not required to initiate the post-processing task. Eliminating such user interaction automates the post-processing task thereby increasing the efficiency of the personnel processing the images, increases the ease-of-use of the image acquisition device and image processing apparatus leading to fewer or no errors in the application of the post-processing task, and enables image applications with more complex post-processing tasks.

The information encoded on the mesh may be different types of data needed for the post-processing task, and different types of data can be encoded in different regions of the mesh to enable different post-processing algorithms to be effective on different regions of the mesh. Thus, one post-processing algorithm could be functional on one region of the mesh and one type of data to enable automatic execution of this algorithm would be encoded on the respective region of the mesh while another post-processing algorithm could be functional on a different region of the mesh and another type of data to enable automatic execution of this algorithm would be encoded on the respective region of the mesh. It is not inconceivable that the regions might overlap and two different types of data might be encoded on the same part of the mesh, i.e., one or more triangles or vertices are associated with two or more different types of data.

Information encoded on the mesh can also comprise regionally-varying parameters that control a post-processing algorithm, i.e., the parameters associated with the triangles and/or vertices of the mesh are not the same at all of the triangles and vertices.

Encoding information on the mesh enables advantageous use of a priori knowledge about the typical location of organs or anatomical structures to be incorporated into the mesh so that upon application of the mesh to segment a similar organ or anatomical structure, user interaction is reduced if not eliminated.

Primary applications of the invention are to segmentation and interpretation of complex organs and related anatomical structures. This includes, but is not limited to, cardiac applications where an initial segmentation of chambers, myocardium and large vessels (aorta, pulmonary artery, etc.) serves as a starting point for subsequent post-processing tasks.

Examples of the use of the method for various post-processing tasks relating to image processing of a heart are described below. Specifically, four examples of post-processing tasks performed in connection with cardiac segmentation are provided, namely, ascertaining the position of the coronary ostia, coronary vessel tracking, segmentation refinement and virtual closing of opened cardiac valves.

With respect to ascertaining the position of the ostia, the ostia are usually defined as the somewhat bulged, branching regions on the aorta wall where the two main coronary arteries, one left and one right, branch off from or leave the aorta. Possible ostium positions are typically restricted to a region close to the aortic roof, i.e., slightly above the aortic valve where the aorta is connected to the left ventricle.

Ascertaining the ostium positions is useful because the ostium positions can be used as seed points for a subsequent, coronary tree extraction algorithm. In this case, the post-processing task to be performed would be the application of the coronary tree extraction algorithm for which information about the position of the ostia is needed. In the prior art, it was necessary for a user to manually define the position of the seed points for the coronary tree extraction algorithm, i.e., by manipulating a user interface device to identify the seed points. By contrast, in the invention, the position of the seed points is derived from the information encoded on the mesh so that the coronary tree extraction algorithm can be automatically provided with the position of the seed points immediately after the mesh is applied to an image of a heart (the heart is segmented using the mesh). Therefore, after applying the mesh to an image containing a heart and segmenting the cardiac chambers and the attached aorta, it becomes possible to restrict the possible locations of the ostia and thereby more easily identify the seed points for the coronary tree extraction algorithm.

Encoding the necessary information for ostia location determination is obtained by initially identifying triangles of the mesh which are close enough to the actual ostium positions in the analyzed image or images, i.e., the training image(s). One or more datasets are formed of the identified mesh triangles. Mesh triangles which are a small distance from the observed ostium positions are also included in the dataset(s) to account for blurred images. The identified triangles are listed, e.g., in a data file. With the triangles, distance information between the triangle and the ostium positions may be included and indeed, for those triangles in close proximity to the known ostia in the analyzed images, distance information is preferably included. The distance information will be useful when searching for the ostia in new images containing a heart and to which the mesh is applied.

The mesh will therefore include not only the manner in which a heart is to be segmented by also the associated list of triangles on the mesh which are determined to be in close proximity to the ostia in the training image(s). By close proximity to the ostia, it is meant within a predetermined distance to the ostia, which distance can be readily ascertained by one skilled in the art.

After forming the list of allowed or plausible triangles of the mesh and encoding it on the mesh, the encoded information is applied as follows. A new image containing a heart is segmented using the mesh model, which includes those parts of the aorta where the ostia are expected to be positioned. Regions in the vicinity of the listed triangles, i.e., those typically outside the aorta, are automatically processed by an appropriate algorithm and an attempt is made to maximize some criteria characterizing a coronary vessel, specifically the coronary artery, in the image. For example, a vessel-presence likelihood or some other criteria may be used. This criteria, i.e., the vessel-presence likelihood, may be combined with the information about how likely a triangle is proximate the respective ostium. This restricts and focuses the search towards identifying vessels close to the most likely triangle having the most coronaries branching off from the aorta, so that as a result, the selection of the best ostium candidate, i.e., the selection of the triangle or vertex most likely to contain the ostium, is improved.

Optionally, a specifically tailored vessel-presence likelihood criteria can be encoded for each individual triangle being searched, i.e., the information encoded on the mesh is not only distance or ostia-presence likelihood information but also some artery characteristics to the different ostia regions. This option offers nominal benefits when the left and right coronary arteries have similar characteristics, but in other applications where the position of two objects such as organs is sought and the objects do not have similar characteristics, this option would be useful.

As an alternative, each triangle or vertex can be encoded with an individually tuned algorithm. That is, when the mesh is applied to a new image, multiple and different algorithms will be executed, one for each triangle or vertex, with a view toward identifying which triangle or vertex contains or is likely to contain either a coronary vessel the presence of which will provide information about the position of the ostia or the ostia itself.

Applying the ostia-position determining post-processing task, a new image showing the position of the ostia would be automatically formed based on or derived from the original image. Preferably, the ostia will be demarcated or delineated to differentiate them from the remaining parts of the new image.

A second application of the method in accordance with the invention is segmentation and tracking of coronary vessels, i.e., coronary arteries and veins. In cardiac image analysis, after segmenting the heart and its chambers, a search for the coronary arteries and/or veins is usually performed and once located, the coronary arteries are segmented. The segmentation of coronary arteries is a difficult task due to their very small dimensions, i.e., typically close to the image resolution, image artefacts, stenoses, and many misleading structures in cardiac images.

Applying the method in accordance with the invention for coronary vessel segmentation and tracking, it becomes possible to restrict the search space for coronary arteries and veins to a thin layer around the myocardium since they are known to be close to the epicardial wall. More specifically, the search space for coronary arteries and veins in an image of the heart and its surrounding area is restricted or focused for vessel tracking by exploiting previously obtained information about the relationship between the segmented structure (the heart) and the vessel(s) for which a search in the segmented structure has been performed.

In the case of coronary arteries, it is known that the coronary arteries are close to the epicardial wall and as such, a probability distribution on this wall can be derived since the main arteries are typically located in well-constrained regions, for example, in grooves between an atrium and associated ventricle.

Encoding previously derived information about expected locations or regions of the coronary vessels on the mesh is therefore important to improve the efficiency of segmentation algorithms, the execution of which constitutes the post-processing task. The method therefore involves analyzing one or more training images containing a heart and manually generating coronary artery tree coordinates. The coronary artery tree coordinates are a group of coordinates of the centerlines of the arteries.

Once the coronary artery tree coordinates are determined from the analyzed training image(s), an analysis is performed as to the relationship between the coordinates and each triangle or vertex of the mesh for the purpose of calculating the likelihood that each triangle or vertex includes the epicardial surface where the coronary arteries are located. In addition to or instead of calculating the likelihood of each triangle or vertex including the epicardial surface, it is possible to calculate the distance between each triangle or vertex of the mesh and the coordinates.

The information about the likelihood of each triangle or vertex containing the epicardial surface and/or the information about the distance between each triangle or vertex and the coordinates is encoded on the mesh. That is, a list of the triangles or vertices is generated and associated with the derived information.

After adapting the mesh to a new image containing a heart and for which the location of the coronary arteries is sought, the information encoded on the mesh is exploited to confine or focus the search for the coronary arteries in the new image preliminary to the segmentation of the coronary artery tree. The segmentation algorithm is executed automatically on those portions of the new image being searched with minimal if any user interaction to segment the coronary artery based on the information about the likelihood of each triangle or vertex containing the epicardial surface and/or the information about the distance between each triangle or vertex and the coordinates of the centerlines of the arteries.

Applying the coronary vessel segmentation and tracking post-processing task, a new image showing one or more coronary vessels would be automatically formed based on or derived from the original image. Each coronary vessel can be demarcated or delineated to differentiate them from the remaining parts of the image.

Segmentation of the coronary artery tree can also be advantageously initialized with seed points obtained using the application of the method to find the ostia, as described above.

Another application of the method in accordance with the invention is for refining cardiac segmentation using specific algorithms, e.g., to properly account for papillary muscles. This can also be referred to as fine segmentation since it occurs after an initial segmentation of the heart.

Some applications need very detailed segmentation of specific anatomical structures, e.g., detailed segmentation of cardiac structures. For example, in electrophysiology treatment planning, it is essential to have highly precise information about the geometry of the left atrium and the connected vessels. Other applications might require fine segmentation of the papillary muscles in the ventricles which is often not achieved by the initial heart chamber segmentation.

As applied to fine-segmentation of the heart as one non-limiting type of anatomical structure, a method in accordance with the invention entails identifying regions of the heart which must be post-processed by applying a refined segmentation thereto and then labeling the mesh triangles or vertices in that region accordingly. The post-processing task to be performed for each of the labeled mesh parts is determined. Thus, a list of triangles or vertices of the mesh are identified as those requiring application of each refined segmentation algorithm so that when the mesh is applied to another heart, each segmentation algorithms can be applied to those triangles or vertices associated therewith.

One example of refined segmentation, starting from the regions defined by the initial mesh model-based segmentation, is to first define regions enclosed by the mesh surfaces, e.g. the left ventricle volume or the myocard, and then re-assign voxels at or close to the region boundaries from a first region to a second region if this increases a homogeneity condition defined on all voxels assigned to the first and second regions. The homogeneity condition may measure the distribution of gray-values within the first and second regions and a re-assignment from one region to another is performed when the distributions become more homogeneous. The segmentation algorithm would be designed to accomplish such voxel re-assignment to those triangles or vertices to which it is applied.

After segmenting a new image using the mesh model-based segmentation, each refined segmentation algorithm is automatically executed on those defined regions enclosed by the mesh surfaces and/or individual triangles. In this manner, execution of the refined segmentation algorithms does not require user interaction and the image analyzer can automatically be provided with an image in which, e.g., the geometry of the left atrium and connected vessels is displayed on the display in better clarity in comparison to a case in which they would be displayed after only the mesh model-based segmentation. This improved clarity resulting from the execution of the refined segmentation algorithm(s).

Yet another application of a method in accordance with the invention is for addressing the virtual closing of cardiac valves which are opened during atrial contraction. This aspect is important in order to arrive at a substantially fixed definition of the ventricular volume for ejection fraction measurements.

During the heart cycle, valves between atrium and ventricle, namely, the mitral valve between the left chambers of the heart and the tricuspid valve between the right chambers of the heart, cyclically open to allow blood flow from atrium to ventricle and close to prevent blood flowing back into the atrium during systole. Ejection fraction measurements are based on the ventricular volume during the heart cycle, and it is important to have a well-defined contour of the ventricle. According to cardiologic measurement protocols, the ventricle is "virtually closed" even for opened cardiac valves at the base of the valve using a "flattened virtual valve" which corresponds to the rest position of the valve without blood flowing from atrium to ventricle. However, well-tuned models often result in a segmentation of the opened valves which do not correspond to the virtually closed valves used for measurements.

In this case therefore, the post-processing task would be replacement of the adapted parts of the model surface representing the opened valve by a surface simulating the virtually closed valve which is as flat as possible. Applying the method in accordance with the invention, the triangles and/or vertices of the valve region which are to be "flattened" during post-processing are identified, and a list of these triangles or vertices is formed. Flattening of the portion of the heart at these triangles or vertices is the post-processing task for the valve under discussion.

After segmentation or adaptation of the mesh model to the heart, the flattening is applied causing the triangulated model surface to be relaxed by shifting the listed vertices such that the sum of the squared edge lengths of all valve triangles is minimized. Vertices not included in the list remain fixed so that the valve is modeled like an elastic sheet which tries to minimize its surface tension.

Applying the virtual closing post-processing task, a new image showing a flattened valve would be automatically formed based on or derived from the original image.

As described above, the invention provides an interface between an initial, successfully performed segmentation of an anatomical structure, such as an organ, to related image processing tasks of similar organs, the related image processing tasks being enabled or improved using the successful initial segmentation and the information or link provided by encoded mesh applied in the segmentation of the similar organs.

The system and methods described above are particularly suited for software adaptation as CAD packages, such as cardiac CT inspection, and interventional planning packages, such as EP planning.

Although illustrative examples and embodiments of the present invention have been described herein with reference to the accompanying drawings, it is to be understood that the invention is not limited to these precise embodiments, and that various other changes and modifications may be effected therein by one of ordinary skill in the art without departing from the scope or spirit of the invention.

The invention claimed is:

1. An apparatus for expediting post-processing of an object in an image being segmented using a mesh, comprising:
a processor programmed to:
receive an identification of a post-processing task to be performed upon the object after segmentation using the mesh;
receive a determination of information including a probability function representing a probability of usefulness of each triangle or vertex of the mesh for the post-processing task;
encode the information on the mesh;
segment the object in a new image using the mesh with encoded information; and
perform the post-processing task by extracting the encoded information from the mesh.

2. The apparatus of claim 1, wherein the information for the post-processing task includes a list of triangles or vertices of the mesh for which the post-processing task will be performed.

3. The apparatus of claim 1, wherein the information for the post-processing task includes a distance value representing a distance between each triangle or vertex of the mesh and an object of interest for the post-processing task.

4. The apparatus of claim 1, wherein determining the information for the post-processing task comprises acquiring at least one training image including the object, segmenting the object in the at least one training image with the mesh and deriving the information based on the segmentation of the at least one training image.

5. The apparatus of claim 1, wherein the processor is further programmed to define a plurality of post-processing tasks, each having different information to enable performance thereof.

6. The apparatus of claim 1, wherein the processor performs the post-processing task automatically without user interaction upon segmentation of the object in the new image.

7. The apparatus of claim 1, wherein to encode the information on the mesh the processor is programmed to encode different types of data for the post-processing task in different regions of the mesh such that different post-processing tasks are applicable on different regions of the mesh.

8. The apparatus of claim 1, wherein in the post-processing task the processor encodes a regionally-varying parameter that controls a post-processing algorithm.

9. The apparatus of claim 1, wherein the object in the image is a heart, the information for the post-processing task includes an identification of triangles or vertices of the mesh within a predetermined distance to actual ostium positions, the mesh being encoded with the identified triangles or vertices and the distance between each triangle or vertices and the ostium position, the processor further being programmed to execute an algorithm to analyze the identified triangles or vertices to determine a likelihood of an ostium being present therein or thereat.

10. The apparatus of claim 1, wherein the object of the image is a heart, the information for the post-processing task the probability function includes a likelihood of each triangle or vertex of the mesh containing a surface in which a coronary vessel is near, the processor further being programmed to execute an algorithm to analyze only those triangles or vertices with a high likelihood of containing a surface in which a coronary vessel is near.

11. The apparatus of claim 10, wherein the information for the post-processing task includes a distance between each triangle or vertex of the mesh and coordinates of the coronary vessel, the processor further being programmed to execute an algorithm to analyze only those triangles or vertices within a predetermined distance from coordinates of the coronary vessel.

12. The apparatus of claim 1, wherein the information for the post-processing task includes an identification of regions of the mesh to be subject to refined segmentation, the mesh being encoded with the triangles or vertices in each identified region, the processor further being programmed to execute a refined segmentation algorithm to additionally segment the portion of the image represented by the encoded triangles or vertices.

13. The apparatus of claim 1, wherein the object of the image is a heart, the information for the post-processing task including an identification of triangles or vertices in an area of a valve region to be artificially flattened, the processor further being programmed to execute a flattening algorithm to shift the identified triangles or vertices.

14. A method for processing an image and displaying the processed image, comprising:
in a preparatory step,
identifying a processing task to be performed upon a heart after segmentation using a mesh,
determining an identification of triangles or vertices in an area of a valve region to be artificially flattened for the processing task, and
encoding the information on the mesh with one or more processors; and
in an operative step with the one or more processors,
acquiring a new image containing the same object,
segmenting the object in the new image using the mesh with encoded information,
performing the processing task by extracting the encoded information from the mesh and executing a flattening algorithm to shift the identified triangles or verticies, and
on a display device, displaying a derivation of the new image modified by the performance of the processing task.

15. The method of claim 14, wherein the step of determining the information required for the processing task comprises acquiring at least one training image including the heart, with the one or more processors segmenting the heart in the at least one training image using the mesh and deriving the information based on the segmentation of the at least one training image.

16. The method of claim 14, wherein the information required for the processing task with the one or more processor further includes a distance value representing a distance between each triangle or vertex of the mesh and an object of interest for the processing task.

17. The method of claim 14, wherein the information for the processing task further includes a probability function representing the probability of usefulness of each triangle or vertex of the mesh for the processing task.

18. An image processing system, comprising:
an image acquisition device for acquiring images of objects to be processed;
a display for displaying images acquired by said image acquisition device before and after processing;
a processing unit coupled to said image acquisition device and said display; and
a user interface for controlling said image acquisition device and said processing unit,
said processing unit being arranged to enable via said user interface initiation of image acquisition, initiation of mesh model-based segmentation of an object in the image, identification of a post-processing task to be performed upon the object after segmentation using the mesh and determination of information required for the post-processing task, wherein the information for the post-processing task includes a distance value representing a distance between triangles or vertices of the mesh and an object of interest for the post-processing task,
said processing unit being further arranged to encode the information required for the post-processing task on the mesh, segment the object in a new image acquired by said image acquisition device using the mesh with encoded information, automatically performing the post-processing task by extracting the encoded information from the mesh and display an image derived from the post-processing of the new image on said display.

19. A non-transitory computer-readable medium carrying software which controls a processing unit to expedite post-processing of an object in an image being segmented using a mesh by performing the steps of:
receiving from a user interface an identification of a plurality of post-processing tasks to be performed upon the object after segmentation using the mesh;
determining information required for the post-processing tasks, each post-processing task having different required information;
encoding the information on the mesh;
segmenting the object in a new image acquired by an image acquisition device using the mesh with encoded information;
performing the post-processing tasks by extracting the encoded information from the mesh.

20. The system of claim 18, wherein the object in the image is a heart, the information required for the post-processing task is the identification of triangles or vertices of the mesh within a predetermined distance to actual ostium positions, the mesh being encoded with the identified triangles or vertices and the distance between each triangle or vertices and the ostium position, the processing unit further being arranged to execute an algorithm to analyze the identified triangles or vertices to determine a likelihood of an ostium being present therein or thereat.

* * * * *